United States Patent [19]

Rodenheber

[11] Patent Number: 4,538,572
[45] Date of Patent: Sep. 3, 1985

[54] ELECTRONICALLY CONTROLLED IGNITION SYSTEM FOR AN INTERNAL COMBUSTION ENGINE

[75] Inventor: Rainer Rodenheber, Heilbronn-Biberach, Fed. Rep. of Germany

[73] Assignee: TELEFUNKEN electronic GmbH, Heilbronn, Fed. Rep. of Germany

[21] Appl. No.: 530,694

[22] Filed: Sep. 9, 1983

[30] Foreign Application Priority Data

Sep. 10, 1982 [DE] Fed. Rep. of Germany ....... 3233554

[51] Int. Cl.³ .............................................. F02B 5/04
[52] U.S. Cl. .................................... 123/418; 123/424
[58] Field of Search ................................. 123/418, 424

[56] References Cited

U.S. PATENT DOCUMENTS

| | | | |
|---|---|---|---|
| 3,749,070 | 7/1973 | Oishi | 123/424 |
| 4,131,098 | 12/1978 | Daniels | 123/424 |
| 4,133,325 | 1/1979 | West | 123/424 |
| 4,138,976 | 2/1979 | Crall | 123/424 |
| 4,142,490 | 3/1979 | Hosaka | 123/418 |
| 4,201,163 | 5/1980 | Hattori | 123/418 |
| 4,259,934 | 4/1981 | Leussink | 123/424 |
| 4,364,344 | 12/1982 | Buetemeister | 123/424 |
| 4,379,444 | 4/1983 | Weber | 123/424 |

Primary Examiner—Ronald B. Cox
Attorney, Agent, or Firm—Spencer & Frank

[57] ABSTRACT

The invention constitutes a supplement to patent application No. P 31 34 883 and to patent application No. P 32 08 088. It relates to the electronic switching-off of the correction circuitry in the event of a large dwell angle and simultaneously maximum correction value. This object is attained by comparing the speed-dependent output voltage of an induction sensor at a comparator to a reference voltage which is chosen so as to be exceeded by the output voltage of the induction sensor from a certain rotor speed on with an output pulse being released at the comparator. The capacitor at which the sawtooth-shaped signal is generated is discharged by means of this output pulse such that there will not be any further correction of the control signal.

4 Claims, 22 Drawing Figures

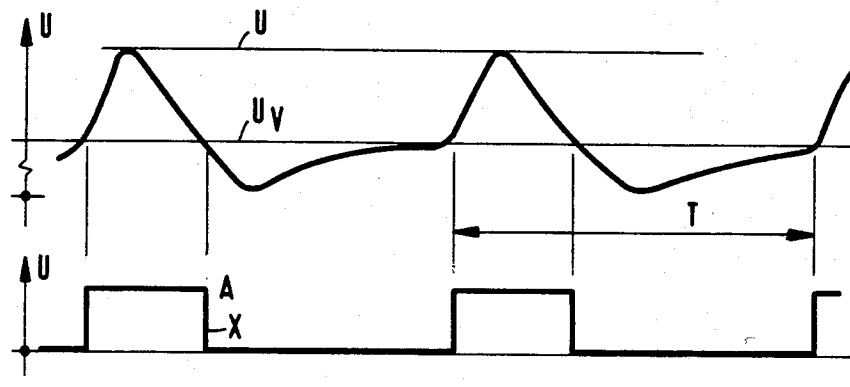
FIG. 2a
FIG. 2b
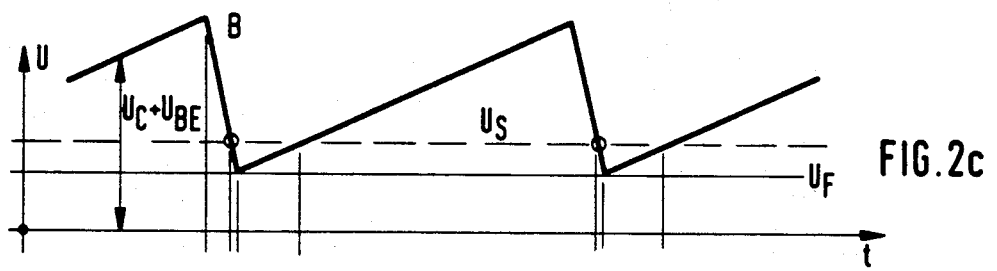
FIG. 2c
FIG. 2d
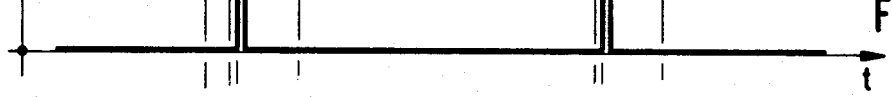
FIG. 2e
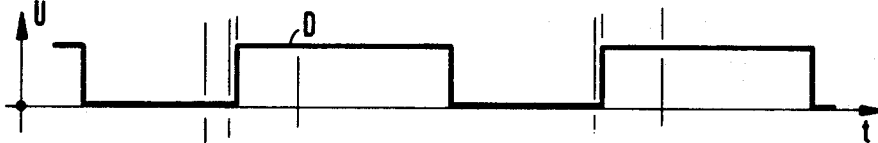
FIG. 2f
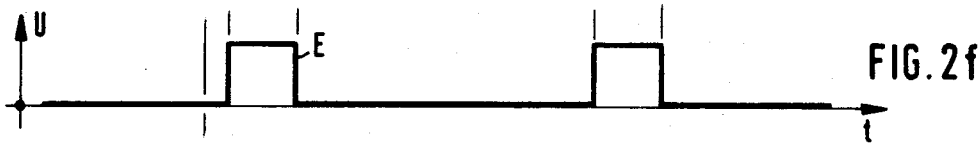
FIG. 2g
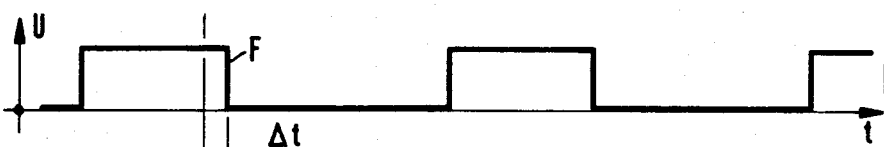
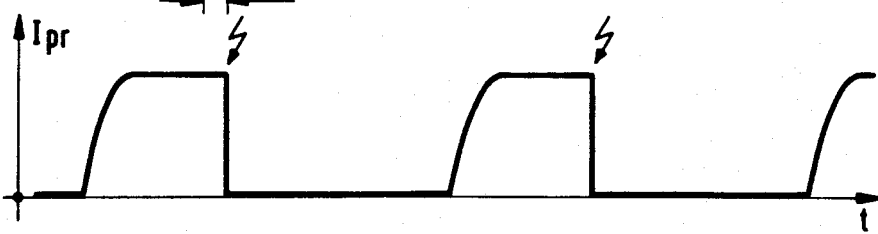
FIG. 2h

ELECTRONICALLY CONTROLLED IGNITION SYSTEM FOR AN INTERNAL COMBUSTION ENGINE

The invention relates to an electronically controlled ignition system for an internal combustion engine for compensation of the advance of the ignition point compared to the mechanical position of the rotor at low speeds, in accordance with the features in the preamble of patent claim 1. An electronically controlled ignition system of this kind is the subject of patent application P No. 31 34 883. This patent application discloses a circuit with which there is first generated a square wave control signal from the output signal of an induction sensor, and from this square wave control signal at low speeds there is derived a correction signal which corrects the system-inherent advance of the ignition point in the lower speed range. This circuit is shown schematically in FIG. 1. Its mode of operation is apparent from FIG. 2.

BRIEF DESCRIPTION OF DRAWINGS

FIGS. 2a-2h, 3a-3f and 4a-4d show various voltage and current curves at points in the inventive circuitry.

As shown in FIG. 1, the circuit comprises a capacitor C which is charged with the charging current $I_L$ and discharged by means of the discharge current $I_E$. The charging current $I_L$ flows continuously, whereas the discharge current $I_E$ is first released via the switch S by the X flank of the input signal A, as indicated in FIG. 2b. The switch S is then opened again when the voltage at the capacitor C reaches the value $U_F$ as indicated in FIG. 2c.

FIG. 2a shows the voltage $U_{ind}$ which is the output voltage of an induction sensor. T signifies the duration of the period and $U_V$ a reference voltage. The reference voltage and the output voltage of the induction sensor are compared at a comparator which is not shown. This results in the square wave control signal A shown in FIG. 2b.

Figure 1:
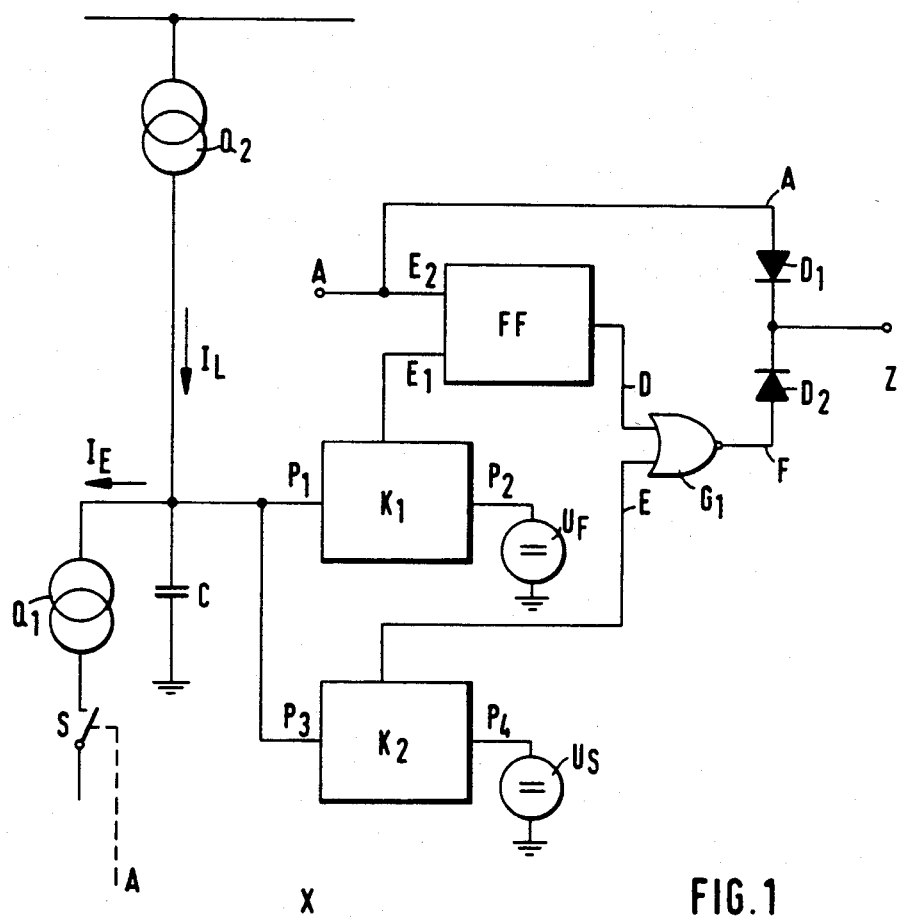
FIG. 1 shows a schematic diagram of the circuit of the invention.

The voltage course B at the capacitor C as shown in FIG. 2c is directed to the comparator $K_1$ via the input electrode $P_1$, and to the comparator $K_2$ via the input electrode $P_3$. The capacitor voltage B is compared to the fixed voltage $U_F$ at the comparator $K_1$ as shown in FIG. 2c. Once the voltage B reaches the voltage $U_F$, the comparator $K_1$ generates an output signal $T_X$ as shown in FIG. 2d. The flip-flop FF is set by these pulses $T_X$ which are fed to the storage flip-flop FF via the connection $E_1$. The flip-flop is reset by the low-high-flank of the input control signal A at input $E_2$. As a consequence, the square wave signal D shown in FIG. 2e is generated at the output of the bistable trigger stage FF.

At the second comparator $K_2$, the capacitor voltage B is compared to the voltage $U_S$ as shown in FIG. 2c. The voltage $U_S$ exceeds the voltage $U_F$ by a value which results from the desired speed from which the correction of the ignition point should equal zero. At the output of the comparator $K_2$ a signal E according to FIG. 2f is therefore generated. This signal E and the output signal D of the trigger stage FF are fed to a NOR gate $G_1$ for generating the correction signal F. The course of the signal F at the output of the NOR gate is shown in FIG. 2g and it is extended as compared with the control signal A by the time $\Delta t$, with $\Delta t$ corresponding to the time required for the falling flank of the sawtooth-shaped signal B to reach the voltage $U_S$. The signals A and F form via the OR gate ($D_1$, $D_2$) the output signal Z which determines the time during which the flow of primary current through the ignition coil is possible. The course of the primary current $I_{pr}$ is illustrated in FIG. 2h. At higher speeds the input control signal A alone determines the primary current since the sawtooth-shaped signal B then only swings between the fixed voltages $U_S$ and $U_F$. For these speeds the time interval $\Delta t$ therefore equals zero.

This electronically controlled ignition circuit described in the older patent application P No. 31 34 883 functions perfectly provided the sum of the dwell angle and the maximum correction of the ignition point—each expressed in percent of the period—does not exceed 100%. It is decisive for the functioning of the circuit according to FIG. 1 for the set pulse $T_X$ to always precede timewise the reset pulse, i.e. the low-high flank of the input control signal A. If this is not ensured the sawtooth-shaped signal B no longer reaches the voltage level $U_F$, becomes instable and exceeds the voltage $U_S$ after only a few pulses of the control signal A.

The dwell angle control devices contained in electronically controlled ignition systems are meant to be able to set an angle of more than 75% at high engine speeds on 4- to 6-cylinder engines. This is necessary in order for the ignition current through the primary coil to reach a sufficiently high value required for this ignition process since the ignition energy is dependent on the peak current value.

Figure 3A:
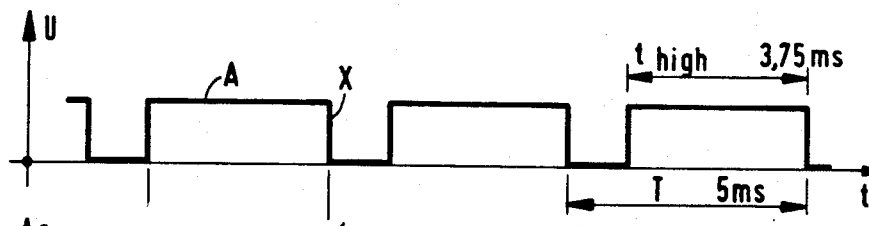

In FIG. 3a, a control signal A is shown for which the dwell angle is $$(t_{high}/T) = 75\%$$

Figure 3B:
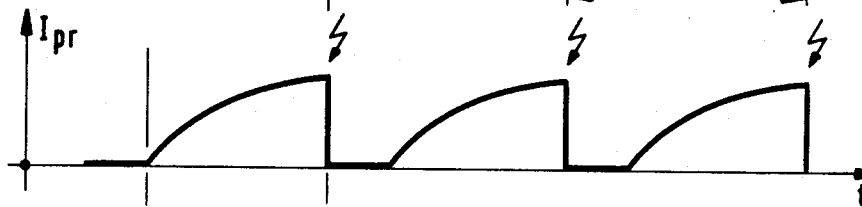
Figure 3C:
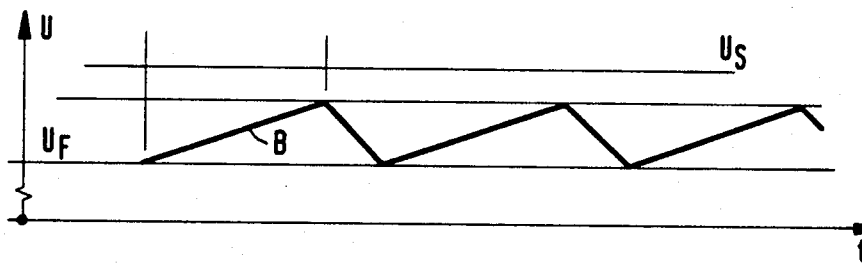

The peak primary current through the ignition coil then reaches a value as shown in FIG. 3b from which as much ignition energy as possible for the ignition process can be generated. If one then chooses a value $A_0 = 25\%$ for the maximum compensation of the ignition point a course B is obtained as shown in FIG. 3c for the voltage at the capacitor C. As is apparent from FIG. 3c, the voltage B just reaches the voltage potential $U_F$, ensuring that the circuit according to FIG. 1 continues to function.

Figure 3D:
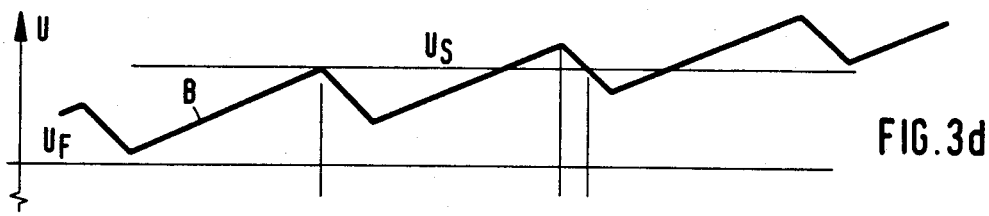
Figure 3E:
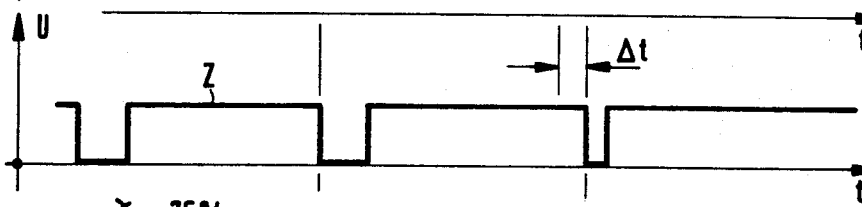
Figure 3F:
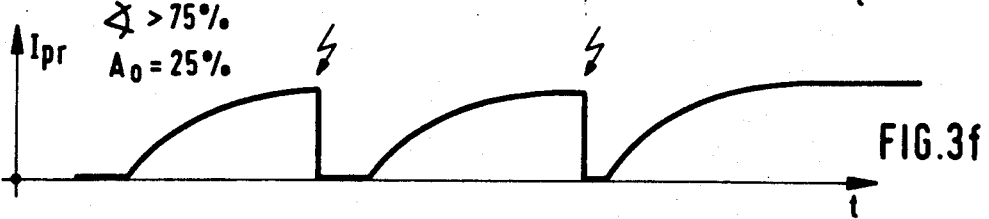

In FIG. 3d, on the other hand, the voltage course B at the capacitor C is illustrated for the event that the dwell angle rises above 75% and, at the same time, the maximum correction $A_0$ of the ignition point compensation amounts to 25% or even exceeds this value. Dwell angles of this size are required in particular for 6-cylinder engines. In the case concerned, the voltage B at the capacitor C no longer reaches the level $U_F$ in the discharge phase and builds up in the shown manner. The circuit functions until the voltage B at the capacitor C exceeds the value $U_S$ and then continuously remains above this amount. The signals E and D according to FIGS. 2e and 2f then continuously take on the low level which means that the output signal Z, as shown in FIG. 1, and FIG. 3e constantly remains on high potential. As a consequence, the primary coil current is no longer switched off. The primary coil current is shown in FIG. 3f and it takes on the state of continuous current from the moment the voltage B at the capacitor C continuously exceeds the potential level $U_S$. Correct operation of the ignition system is therefore no longer ensured from this moment on.

The object underlying the invention is to provide an electronically controlled ignition system which remains capable of functioning even with large dwell angles and simultaneously high maximum compensation values for the ignition point advance.

In the older patent application P No. 32 08 088 it has already been suggested that the correction signal be rendered ineffective, but this is done with the help of external switches which are manually actuated or temperature-actuated switches. These switches must be driven in such a way that the sum of the dwell angle and maximum correction value—each expressed in percentage of the period—cannot reach the amount of 100%. If a corresponding drive arrangement is not available, the condition outlined above can only be met by doing without (a) a high correction value or (b) a high maximum dwell angle.

The present invention enables the abovementioned condition to be met in an electronic switching-off arrangement without having to forgo a high maximum dwell angle by ensuring that the voltage B at the capacitor C cannot exceed the voltage $U_S$ in the manner described.

The object stated is attained in an electronically controlled ignition system as set forth in the preamble of patent claim 1 by the features recited in the characterizing clause of this claim. With this circuit it is particularly advantageous that a speed-dependent voltage which is compared to a reference voltage can be directly derived from the voltage at the induction sensor. By the selection of the value for the reference voltage it can be determined from which speed on the voltage at the capacitor C is kept so low that exceeding of the voltage $U_S$ is no longer possible. The dwell angle control must ensure that the sum of the maximum dwell angle and the maximum correction value $A_0$ is less than 100% for the speed range for which a compensation of the ignition point is desired.

For the speed range after the electronic switching-off, greater dwell angle values may be set.

Figure 7:
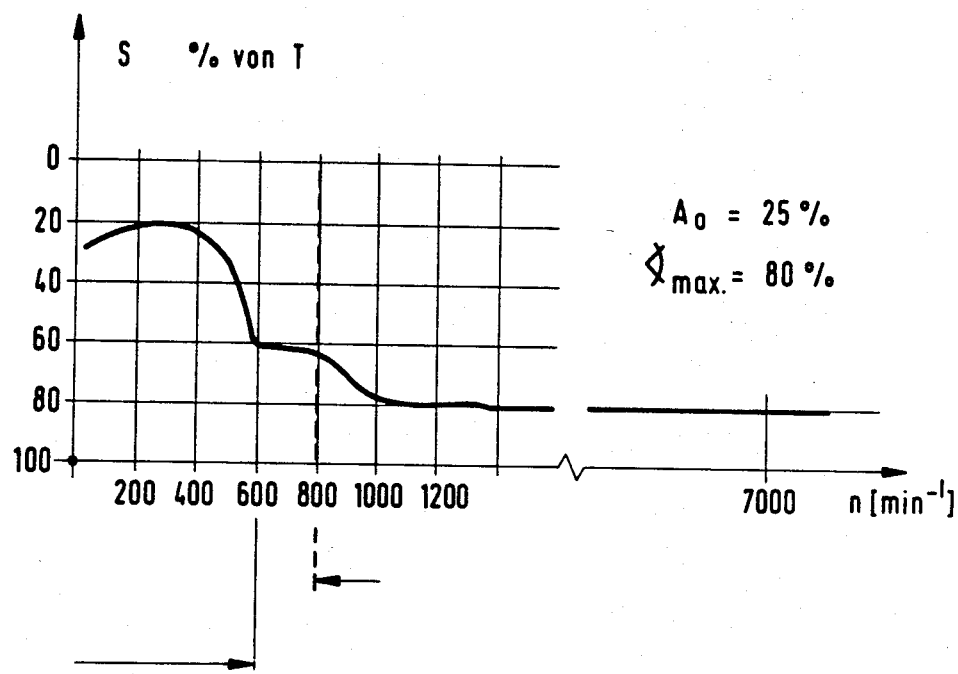
FIG. 7 shows an example of the dwell angle limit curve.

FIG. 7 shows an example of a dwell angle limit curve. The desired compensation range extends to approximately 600/min. At approximately 800/min the electronic switching-off commences. From about 1,000/min on, the sum of dwell angle and maximum correction value $A_0$ exceeds 100%.

Figure 6:
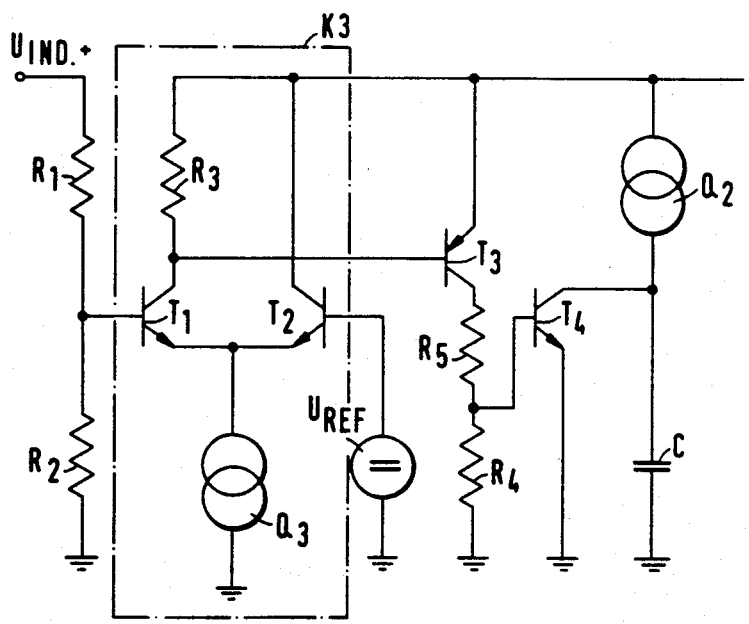
FIG. 6 shows the circuit diagram of a further aspect of the invention.

The comparator required for the circuit according to the invention is preferably constructed like a differential amplifier and consists of two transistors coupled at the emitter electrodes. The input signals are fed to the base electrodes of these transistors in order to generate voltage pulses at the output of the comparator with which the capacitor C can be discharged. The reference voltage, for example, is chosen such that it is exceeded by the output peak voltage of the induction sensor with which it is compared from a rotor speed of approximately 800/min on so that from this speed onwards discharge pulses are fed to the capacitor. The capacitor or the current source $Q_2$ in FIG. 6 is preferably dimensioned such that the capacitor can only be charged up to a residual voltage smaller than the voltage $U_S$ when output pulses are present at the comparator.

The invention will now be explained in greater detail with reference to an embodiment. FIGS. 4a to 4d show the signal courses which are essential to the invention.

Figure 5:
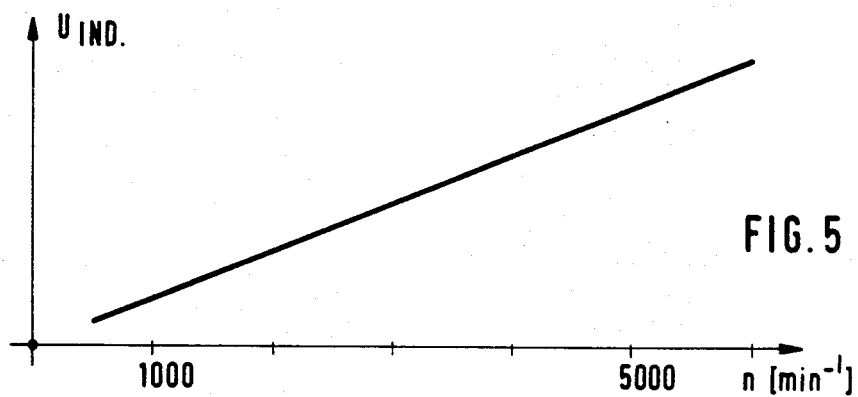
FIG. 5 shows the speed dependency of the induction sensor peak voltage.

FIG. 5 shows the speed-dependency of the peak voltage at the induction sensor. FIG. 6 shows the circuitry arrangement in the realization of the invention.

Figure 4A:
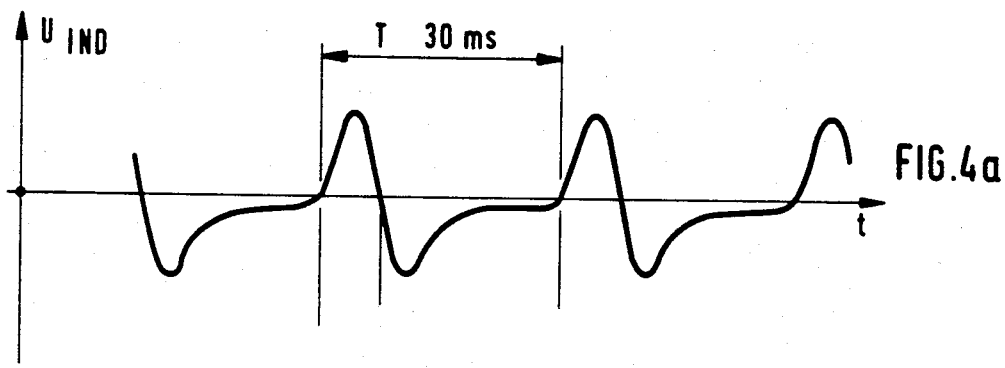
Figure 4B:
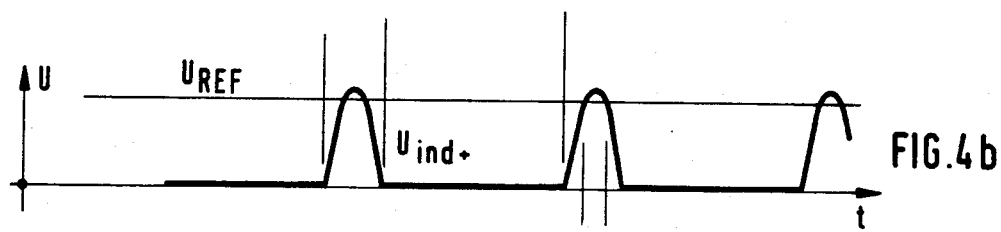
Figure 4C:
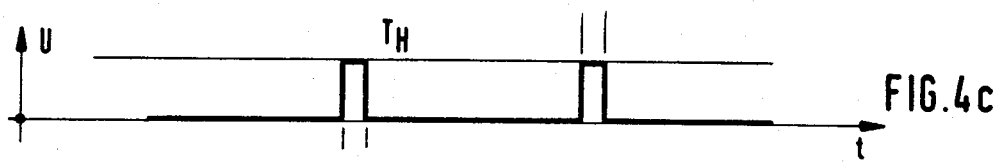
Figure 4D:
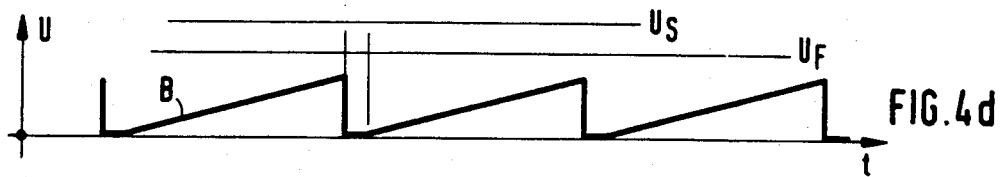

The output signal of the induction sensor is illustrated in FIG. 4a, with the positive peak voltage according to FIG. 5 rising approximately linearly with the speed. This positive voltage course of the induction sensor is compared with a reference voltage $U_{REF}$ according to FIG. 4b. Once the peak voltage of the induction sensor exceeds the reference voltage $U_{REF}$ output pulses $T_H$ occur at the comparator which compares the two voltages. These voltage pulses are shown in FIG. 4c. Their width increases with an increase in the speed. These voltage pulses get to the base of $T_4$ in FIG. 6 so that the capacitor C is discharged by each pulse to the extent that the voltage B at the capacitor C can never exceed the value $U_S$ during the increase phase. The voltage course B at the capacitor C for the case concerned is illustrated in FIG. 4d.

In a realized circuit with a maximum dwell angle of 80% and a compensation value of the ignition point of no more than 25%, the charging current was $I_L = 12.5$ $\mu$A and the discharge current $I_E = 50$ $\mu$A (FIG. 1). At a speed of 600/min it was required that the ignition compensation should drop from 25% to 0%. The voltage $U_F$ was fixed at 0.4 volts. The capacitor C had the value 2 $\mu$F. The dwell angle control could for the first time set the maximum dwell angle of 80% from 1,000/min on. At this speed, the capacitor was already sufficiently discharged.

In the circuit according to FIG. 6, the positive part of the induction voltage was supplied to a voltage divider comprised of the resistors $R_1$ and $R_2$, with the voltage pick-up leading to the base electrode of the transistor $T_1$. The npn transistors $T_1$ and $T_2$ which form the comparator $K_3$ are connected with the mutual current source $Q_3$ at the emitter electrodes. The voltages that are to be compared are fed to the base electrodes of the two transistors. The voltage $U_{REF}$ which is derived internally from the "band-gap voltage" is fed to the base electrode of the transistor $T_2$. Once this voltage becomes smaller than the base voltage of the transistor $T_1$, the transistor $T_1$—and thus $T_3$—become conductive. Located in the collector branch of transistor $T_3$ are resistors $R_4$ and $R_5$ at which a voltage decrease occurs when transistor $T_3$ is conductive which opens the npn transistor $T_4$ and thus releases the discharge course of capacitor C via tis transistor $T_4$. Pulses which open transistor $T_4$ first occur at approximately 800/min. At approximately 1,000/min, these pulses practically discharge the capacitor C to 0 volts. During the remaining residual time of the period, which amounts to 30 msec at 1,000/min, the capacitor C is recharged at a value of 2 $\mu$F and the aforementioned charging current of $I_L = 12.5$ $\mu$A only to 0.19 volts. The next pulse at the comparator output once again discharges the capacitor C to 0 volts. Thus from a speed of 1,000/min on it is ensured that the B signal always remains below the value of the voltage $U_F$ of 0.4 volts.

If the rotational speed further increases the peak value of the output signal at the induction sensor also becomes greater. The width of the pulses at the comparator output therefore also increases so that the B signal can then only be charged to values below 0.19 volts.

The electronic switching-off of the ignition system according to the invention offers the advantage that even in the event of excessive speed during the start-up phase, ignition breaks or even the ruining of the ignition coil due to a continuous current flow in the primary coil is prevented even in ignition systems with an extensive dwell angle control range and high compensation values of the ignition point advance.

What is claimed is:

1. Electronically controlled ignition system for an internal combustion engine for compensation of the advance of the ignition point compared with the mechanical position of the rotor at low speeds, wherein a correction signal (F) is derived from a square wave control signal (A) derived directly from the induction sensor by a sawtooth-shaped signal (B) being generated within each period of the control signal from a flank (X) of this signal and by the correction signal (F) being lengthened with respect to the control signal by a part ($\Delta t$) of the time determined by the falling flank of the sawtooth-shaped signal, said part ($\Delta t$) changing with the speed (n) of the rotor, said sawtooth-shaped signal being given by the voltage course at a capacitor (C) which is charged up to the occurrence of the control flank (X) of the control signal, after which it is discharged up to the point where it reaches a predetermined reference voltage ($U_F$), characterized in that the speed-dependent output voltage ($U_{ind}$) of the induction sensor is compared with a reference voltage ($U_{REF}$) at a comparator ($K_3$), with the reference voltage ($U_{REF}$) being chosen such that it is exceeded by the output voltage of the induction sensor from a certain speed of the rotor on, with an output pulse ($T_H$) being released at the comparator, and in that the capacitor (C) is discharged with this output pulse ($T_H$) such that correction of the control signal (A) does not take place, and wherein the comparator ($K_3$) is compared of two transistors ($T_1$, $T_2$) connected at the emitter electrodes, as in a differential amplifier, with the input signals being fed to the base electrodes of the transistors, and the output signal tapped at a collector resistor ($R_3$) of a transistor ($T_1$) is fed to a transistor ($T_4$) connected in parallel with the capacitor (C), which transistor ($T_4$) is made conductive at the occurrence of an output pulse ($T_H$) at the comparator and serves as a discharge path for the capacitor (C).

2. Electronically controlled ignition system for an internal combustion engine for compensation of the advance of the ignition point compared with the mechanical position of the rotor at low speeds, wherein a correction signal (F) is derived from a square wave control signal (A) derived directly from the induction sensor by a sawtooth-shaped signal (B) being generated within each period of the control signal from a flank (X) of this signal and by the correction signal (F) being lengthened with respect to the control signal by a part ($\Delta t$) of the time determined by the falling flank of the sawtooth-shaped signal, said part ($\Delta t$) changing with the speed (n) of the rotor, said sawtooth-shaped signal being given by the voltage course at a capacitor (C) which is charged up to the occurrence of the control flank (X) of the control signal, after which it is discharged up to the point where it reaches a predetermined reference voltage ($U_F$), characterized in that the speed-dependent output voltage ($U_{ind}$) of the induction sensor is compared with a reference voltage ($U_{REF}$) at a comparator ($K_3$), with the reference voltage ($U_{REF}$) being chosen such that it is exceeded by the output voltage of the induction sensor from a certain speed of the rotor on, with an output pulse ($T_H$) being released at the comparator, and in that the capacitor (C) is discharged with this output pulse ($T_H$) such that correction of the control signal (A) does not take place, and wherein the reference voltage ($U_{REF}$) is chosen such that it is exceeded by the peak output voltage of the induction sensor from a speed of the rotor of approximately 1,000/min up, and consequently output pulses ($T_H$) which discharge the capacitor occur at the output of the comparator ($K_3$), and the capacitor (C) is dimensioned so as to ensure that it is merely charged to a residual voltage when output pulses are present at the comparator, said residual voltage being smaller than the fixed voltage ($U_F$) to which the sawtooth-shaped signal (B) is compared in order to obtain a correction signal (F).

3. Electronically controlled ignition system according to claim 1, characterized in that the reference voltage ($U_{REF}$) is chosen such that it is exceeded by the peak output voltage of the induction sensor from a speed of the rotor of approximately 1,000/min up, and consequently output pulses ($T_H$) which discharge the capacitor occur at the output of the comparator ($K_3$).

4. Electronically controlled ignition system according to claim 3, characterized in that the capacitor (C) is dimensioned so as to ensure that it is merely charged to a residual voltage when output pulses are present at the comparator, said residual voltage being smaller than the fixed voltage ($U_F$) to which the sawtooth-shaped signal (B) is compared in order to obtain a correction signal (F).

* * * * *